(12) United States Patent
Yang et al.

(10) Patent No.: US 10,764,854 B2
(45) Date of Patent: Sep. 1, 2020

(54) METHOD OF CONFIGURING TIMING ADVANCE GROUP AND/OR VALUE OF TIME ALIGNMENT TIMER

(76) Inventors: Tao Yang, Shanghai (CN); Seau Sian Lim, Swindon (GB)

( * ) Notice: Subject to any disclaimer, the term of this patent is extended or adjusted under 35 U.S.C. 154(b) by 0 days.

(21) Appl. No.: 14/345,866

(22) PCT Filed: Sep. 14, 2012

(86) PCT No.: PCT/IB2012/002018
§ 371 (c)(1),
(2), (4) Date: Mar. 19, 2014

(87) PCT Pub. No.: WO2013/046019
PCT Pub. Date: Apr. 4, 2013

(65) Prior Publication Data
US 2014/0228013 A1      Aug. 14, 2014

(30) Foreign Application Priority Data

Sep. 30, 2011   (CN) .......................... 2011 1 0296358

(51) Int. Cl.
*H04W 56/00*       (2009.01)
(52) U.S. Cl.
CPC ..... *H04W 56/0045* (2013.01); *H04W 56/009* (2013.01)
(58) Field of Classification Search
CPC ............................................. H04W 56/0045
See application file for complete search history.

(56) References Cited

U.S. PATENT DOCUMENTS

| 2010/0177747 | A1 | 7/2010 | Chun et al. |
| 2010/0182952 | A1* | 7/2010 | Jeong ...................... H04L 1/189 370/328 |
| 2010/0254356 | A1 | 10/2010 | Tynderfeldt et al. |
| 2010/0284376 | A1* | 11/2010 | Park .................. H04W 56/0045 370/336 |
| 2010/0322175 | A1 | 12/2010 | Chen |
| 2012/0257570 | A1* | 10/2012 | Jang ........................ H04L 5/001 370/328 |

(Continued)

FOREIGN PATENT DOCUMENTS

| CN | 101646234 A | 2/2010 |
| CN | 102014477 A | 4/2011 |

(Continued)

OTHER PUBLICATIONS

Alcatel-Lucent, Alcatel-Lucent Shanghai Bell, "TA group management for SCell," TSG-RAN WG2#75, Aug. 22-26, 2011, Athens, Greece, R2-114318, Agenda Item: 7.1.1.3, Document for: Discussion, 3 pages.

(Continued)

*Primary Examiner* — Anthony S Addy
*Assistant Examiner* — Farid Seyedvosoghi
(74) *Attorney, Agent, or Firm* — Fay Sharpe LLP

(57) ABSTRACT

The invention proposes a method, of configuring a timing advance group for a secondary cell, in a base station, a method, of configuring a value of a time alignment timer for a secondary cell, in a base station, a method of configuring a value of a time alignment timer in a user equipment, and a method of configuring a timing advance group in a user equipment.

5 Claims, 2 Drawing Sheets

(56) References Cited

U.S. PATENT DOCUMENTS

| | | | | |
|---|---|---|---|---|
| 2012/0281680 A1* | 11/2012 | Bostrom | ............... | H04L 5/0051 370/336 |
| 2012/0282969 A1* | 11/2012 | Jiang | ................. | H04W 56/0005 455/517 |

FOREIGN PATENT DOCUMENTS

| | | |
|---|---|---|
| CN | 102158948 A | 8/2011 |
| CN | 102170337 A | 8/2011 |
| EP | 2 495 886 A1 | 9/2012 |
| JP | 2011503960 | 1/2011 |
| JP | 2011520376 | 7/2011 |
| WO | WO 2009/136706 | 11/2009 |
| WO | WO 2010/087570 A | 8/2010 |
| WO | WO 2010/140798 A | 12/2010 |
| WO | WO 2011/085200 | 7/2011 |
| WO | 2012/138132 A2 | 10/2012 |
| WO | WO 2013/010576 | 1/2013 |

OTHER PUBLICATIONS

Huawei, H., "TA group management", R2-113996, 3GPP TSG-RAN WG2 Meeting #75, Athens, GR, Aug. 22-26, 2011.

Nokia Siemens Networks, Nokia Corporation, "TA group configuration", R2-114020, 3GPP TSG-RAN WG2 Meeting #75, Athens, Greece, Aug. 22-26, 2011.

International Search Report for PCT/IB2012/002018 dated Mar. 7, 2013.

Huawei, Hisilicon, "Signalling for the TA Group Management," 3GPP TSG-RAN WG2 Meeting #76, San Francisco, USA, Nov. 14-18, 2011, R2-115827, Agenda item: 7.1.2.3, Document for: Discussion and Decision, 4 pages.

Renesas Electronics Europe, "Discussion on Multiple Timing Advance," 3GPP TSG-RAN WG2 Meeting #73bis, Shanghai, China, Apr. 11-15, 2011, R2-111982, Agenda item: 7.1, Document for: Discussion, 5 pages.

Interdigital Communications, "Support for multiple Timing Advance in LTE CA," 3GPP TSG-RAN WG2 #74, Barcelona, Spain, May 9-13, 2011, TDOC R2-113255, Agenda Item: 7.1.1, Document for: Discussion, Decision, 5 pages.

Samsung, "UL synchronization maintenance for SCell," 3GPP TSG-RAN2#75 meeting, Athens, Greece, Aug. 22-26, 2011, R2-114164, Agenda Item: 7.1.1.1, Document for: Discussion and decision, 5 pages.

Nokia Siemens Networks, et al., "Usage of RRC Parameters", R2-090151, 3GPP TSG-RAN2 Meeting #64bis, Ljubljana, Slovenia Jan. 12-16, 2009.

3GPP TS 36.331, V10.2.0 (Jun. 2011), 3rd Generation Partnership Project; Technical Specification Group Radio Access Vetwork; Evolved Universal Terrestrial Radio Access (E-UTRA); Radio Resource Control (RRC); Protocol specification (Release 10).

* cited by examiner

Drawing of the description

METHOD OF CONFIGURING TIMING ADVANCE GROUP AND/OR VALUE OF TIME ALIGNMENT TIMER

FIELD OF THE INVENTION

The present disclosure relates to carrier aggregation-based wireless communication and particularly to a method of configuring a timing advance group and/or a value of a time alignment timer.

BACKGROUND OF THE INVENTION

At present, the concept of a Timing Advance (TA) Group (TA group) has been accepted to support multiple TA values in the R11. With a TA group, cells (including a primary cell (Pcell) and secondary cells (Scells)) sharing the same TA value are grouped into the same TA group, and Scells which do not share the same TA value as the Pcell are grouped into a TA group different from the Pcell. Furthermore Scells with the same TA value will be grouped into the same TA group. With the introduction of a TA group, each TA group has to be identified with a TA Group Identifier (TAG ID). Thus it is desirable to address where the TA identifier is identified and when and where a value of a Time Alignment Timer (TAT) for the TA group will be transmitted.

In some proposals, it is proposed to transmit a TAG ID when a Scell is being configured (for example, when the Scell is being added to a UE) or during MAC activation. In the majority of configuration scenarios, either of the foregoing two schemes can work well because a base station can obtain a network deployment characteristic via an Operation and Maintenance (OAM) command. With the presence of a repeater (particularly an ad-hoc repeater), the foregoing schemes may require subsequent Radio Resource Control (RRC) connection reconfiguration or MAC activation to reassign a TA group because a base station may have not assigned a correct TA group during initial reconfiguration or MAC activation in that at that time the base station did not know the location of the UE, that is, the base station did not know whether the UE is in the repeater.

For example, the following two scenarios will be studied:

In a first scenario, the base station assumes that a UE is in a coverage range of the repeater and assigns a new TA group for the Scell.

In a second scenario, the base station assumes that the UE is not in the coverage range of the repeater, and the base station assigns an existing TA group for the Scell.

For the first scenario, the base station may have to reassign an existing TA group for the Scell of the UE if the UE is not in the coverage range of the repeater, thus requiring subsequent RRC or MAC signaling.

For the second scenario, if the UE is in the coverage range of the repeater, then the base station detects that the UE is in the coverage range of the repeater and then will not know a specific existing TA group to be reassigned until it receives a pilot from the user equipment.

No proposal has been made so far as to the problem of when/where to transmit or release a TAT value of a TA group including only Scells. However when a TA group includes a Pcell, a TAT value will be transmitted when the Pcell is established (that is, during establishment or reestablishment of an RRC connection) or the Pcell is changed as stated in the Release 10 (Rel-10).

SUMMARY OF THE INVENTION

According to a first aspect of the invention, there is provided a method, of configuring a timing advance group for a secondary cell, in a base station, the method including the steps of: II1. triggering a random access procedure of a user equipment over the secondary cell; II2. obtaining a timing advance value of the user equipment over the secondary cell according to a result of the random access procedure of the user equipment over the secondary cell; and II3. determining a final timing advance group to which the secondary cell belongs according to the timing advance value.

According to a second aspect of the invention, there is provided a method, of configuring a timing advance group for a secondary cell, in a base station, the method including the steps of: determining whether a timing advance value is valid for a primary cell and the secondary cell; and creating a new timing advance group for the secondary cell, if the timing advance value is invalid for the primary cell and valid for the secondary cell and the secondary cell belongs to an activated secondary cell.

According to a third aspect of the invention, there is provided a method, of configuring a value of a time alignment timer for a secondary cell, in a base station, the method including any one of the following items of:—transmitting the value of the time alignment timer to a user equipment via an RRC message; —including and transmitting to the use equipment the value of the time alignment timer in a physical random access procedure; and—including and transmitting to the use equipment the value of the time alignment timer in media access control layer control signaling.

According to a fourth aspect of the invention, there is provided a method, of configuring a value of a time alignment timer in a user equipment, the method including the steps of:—receiving a value of a new time alignment timer from a base station; —determining whether there is a currently operating time alignment timer; and—if there is the currently operating time alignment timer, then disabling the currently operating time alignment timer and operating the new time alignment timer; or waiting for the termination of the operation of the currently operating time alignment timer and operating the new time alignment timer after the termination.

According to a fifth aspect of the invention, there is provided a method of configuring a timing advance group in a user equipment, the method including the steps of:—receiving a new timing advance group identifier from a base station; —determining whether an identifier of a timing advance group to which the user equipment currently belongs is consistent with the new timing advance group identifier; and—replacing the identifier of the timing advance group currently belonging to with the new timing advance group identifier, if not consistent.

With the solution of the invention, subsequent RRC connection reconfiguration can preferably be saved thereby a signaling overhead is saved, and a corresponding timing advance group can be configured rapidly for a Scell.

BRIEF DESCRIPTION OF DRAWINGS

Other features, objects and advantages will become more apparent from the following detailed description of non-limiting embodiments taken with reference to the drawings in which.

Identical or like reference numerals throughout the drawings denote identical or like step features or devices/modules.

DETAILED DESCRIPTION OF EMBODIMENTS

Figure 1:
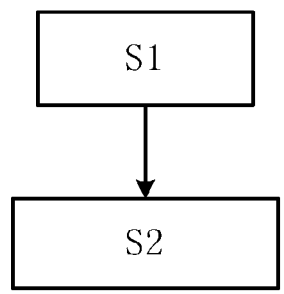
FIG. 1 illustrates a flow chart of a method according to an embodiment of the invention.

A "timing advance value" as referred to in the invention will be described briefly below.

A receiver of a user equipment sets an initial timing advance value via a random access procedure after initially being synchronized with downlink transmission received from a base station. This requires the user equipment to transmit a random access preamble sequence so that the base station can hereby estimate required uplink transmission time, and the base station responds with an 11-bit initial timing advance command in a Random Access Response (RAR) message.

A timing advance has to be updated constantly after initially being set for each user equipment so as to counteract a variation of an arrival time of an uplink signal at the base station. A timing advance update process to eliminate these influences is performed in a closed-loop mechanism, where the base station measures received uplink transmission and transmits a timing advance update command to instruct the user equipment to adjust its new transmission timing relative to a previous transmission timing (only unsynchronized user equipments set their transmission timing relative to previously received downlink timing; and all of subsequent adjusting will be made relative to the latest uplink transmission timing).

It is proposed to allow the base station to reassign a TA group in a PRACH procedure so as to address the foregoing problem of a subsequent RRC message or MAC CE overhead due to reassignment of a TA group.

Assignment of TA Group

There are at least the following two scenarios for assignment of a TA group:

In a first scenario, a base station clearly knows both configuration of a network and a location of a user equipment, so the base station can assign a TA group directly for each Scell.

In a second scenario, the base station does not know the configuration of the network or the specific location of the user equipment, so the base station can not derive accurately a target TA group of the Scell.

For the first scenario, the base station can accurately determine for each Scell a TA group to which the Scell belongs; but for the second scenario, the base station can not predict directly a TA group to which each Scell belongs. In one method, the base station estimates a TA group of a Scell based upon a PRACH procedure, which can be performed in the following two steps:

In the step S1, the base station triggers a PRACH procedure over the Scell and obtains a TA value guaranteeing uplink transmission; and In the step S2, the base station compares the obtained TA value with respective TA values pre-stored on the base station.

If the obtained TA value is approximate to a TA value of a specific existing TA group, that is, a difference therebetween is within a predetermined range, then the base station knows that the corresponding Scell belongs to the existing TA group; or If the base station finds that a difference between the obtained timing advance value and a TA value of any existing TA group exceeds the predetermined range, then the base station knows that the Scell shall belong to a new TA group, so that the base station can newly assign a TA group for the Scell.

Either the first scenario where the base stations knows the network configuration and the location of the user equipment or the second scenario where the user equipment does not know the network configuration and/or the location of the user equipment can fall into the following three situations:

First Situation:

In a Scell configuration or Media Access Control (MAC) command, the following two TA group ID configuration steps are performed:

a) In the step 1, an initial TA group ID is specified in an RRC message which is used for configuring the new Scell, or the initial TA group ID is specified in a first MAC PDU transmitted for the new Scell.

b) In the step 2, the following steps are triggered if the initial TA group ID is incorrect (as detected by the base station):

i. A PRACH procedure is performed over the Scell, and the base station can correspondingly estimate a final TA group ID by comparing a required TA value of the Scell with TA values of other existing TA groups.

ii. The base station includes the final TA group ID in a downlink (DL) message if necessary.

This will be discussed respectively in the following two aspects:

1. For a contention-free radio access procedure (CRFA), the final TA group ID is included in a Random Access Response (RAR) message.

2. For a contention-based radio access procedure (CBRA), the final TA group ID is included in a message 4.

Second Situation:

Reconfiguration of TA Group:

a) The base station triggers a PRACH over the Scell and determines a target TA group identifier.

b) The base station bears a target Timing Advance (TA) group identifier on a message 2 (i.e., a Random Access Response (RAR) message) in a CFRA mode, or the base station bears a target timing advance group identifier on a message 4 in a CBRA mode.

Both the foregoing first situation and second situation can be summarized as the following two steps:

In the step 1, the base station assigns an initial TA group for the newly configured Scell via an RRC message; and In the step 2, the base station reassigns a new TA group for the TA group and transmits the new TA group to the user equipment, for example, in a PRACH procedure.

Necessities and roles of the foregoing first step and second step will be discussed below respectively for the first scenario and the second scenario.

For the first scenario, the step 1 will be sufficient because the base station can clearly know to which TA group the newly configured Scell belongs.

For the second scenario, the base station can assign a new TA group for the Scell in the step 1 so as to ensure correct uplink transmission of the user equipment. Then the base station compares the newly assigned TA value with TA values of existing TA groups in the step 2 to determine whether there is an existing TA group with similar uplink transmission to the new Scell. If not, then the base station knows that the Scell belongs to a new TA group and the TA group previously assigned for the Scell is correct. If so, then the base station knows that the new Scell belongs to the TA group with similar uplink transmission, that is, a difference between the TA value of the TA group and the newly assigned TA value of the TA group is within a predetermined range. The predetermined range relates to a specific implementation issue and is relevant to production parameters of respective manufactures but irrelevant to the gist of the invention, so a repeated description thereof will be omitted here. Therefore the base station indicates the existing TA group identifier to the user equipment in a PRACH procedure. For example, the base station can insert the TA group identifier in an RAR message for a CFRA. However the base station has to include the TA group identifier in a message 4 for a CBRA because the base station can determine which user equipment has performed the random access procedure only if the message 4 is transmitted in the contention-based random access scheme.

As can be apparent from the foregoing discussion, the step 1 is advantageous to the first scenario because no PRACH is required to assign a TA group in this scenario. The step 1 may not be necessary for the second scenario because a correct TA group identifier is determined based upon the PRACH procedure in the step 2. However the step 1 is also advantageous to even the second scenario because in the second scenario a new status of the Scell is avoided in the step 1 in such a scenario, that is, the Scell is configured but there is no TA group assigned therefore.

Third Situation:

A change in TA group will be taken into account below in the third situation.

For the situation with a change in TA group, the base station will consider that a Scell shall not continue belonging to a current TA group if the base station detects that ongoing uplink transmission of the Scell is no longer valid, for example, the base station has not receive any uplink data transmission over the Scell for a predetermined period of time. Thus the base station either deletes the Scell and adds a new Scell over the same band and then performs the foregoing PRACH procedure to assign a TA group.

Alternatively the base station can trigger directly a PRACH procedure over the Scell to obtain a required TA value and then further determine a correct TA group.

For the foregoing two situations, the final TA group identifier is also transmitted to the user equipment via a PRACH procedure, for example, transmitted in an RAR for a CFRA and in a message 4 for a CBRA. The user equipment knows that the TA group identifier of the Scell with the PRACH has been modified when the TA group identifier is provided via the RAR or the message 4. Alternatively the base station can use an RRC message to configure a new TA group identifier for the Scell if the base station can know definitely a target TA group of the corresponding Scell.

Particularly such a situation 3A may arise because an agreement has been made that a Pcell group will not be changed.

Situation 3A:

Change in Pcell Group

The base station detects that the TA value has been invalided for the Pcell, for example, according to an uplink transmission condition, for example, the base station has not received any uplink data transmission over the Scell for a predetermined period of time, but does not detect that the TA value has been invalided for any other active Scell in a Pcell group to which the Pcell belongs, that is, the TA is still valid for the Scells in the Pcell group, that is, the base station does not detects a temporal drift of any active Scell in the Pcell group.

For the Pcell, the base station shall trigger the PRACH over the Pcell to obtain a new TA value to guarantee operation of the Pcell.

As currently concluded, an ID of a TA group guaranteeing a Pcell will never be changed, and also the base station does not detect a temporal drift of any active Scell, the new TA value obtained after the new PRACH procedure is triggered for the Pcell is invalided for these active Scells. Then the base station puts these active Scells with their original TA values being still valid into a new timing advance group, including assigning a new TA group identifier for all the Scells in the new TA group (that is, active Scells with TA values being still valid). The original TA values can continue their usage by these Scells in the new TA group. Optionally a new PRACH procedure can be initiated respectively for all the Scells in the new TA group to obtain corresponding TA values. Of course, the TA values obtained via the PRACH procedure may very likely be the same as the previous TA values.

The invention can also be equally applicable to all the Scells in the original Pcell group although the foregoing embodiments merely describe a process for an active Scell.

TAT Value of TA Group Including Only Scells

For the R11, mutually independent TATs are operated for respective TA groups, and a different TAT value can be configured for each TA group. Thus an important issue is how to configure a TAT value for each TA group, and another issue is how to reconfigure a TAT value of the TA group.

Under the TAT operation principle of the R10, a TAT shall be started or restarted when a user equipment receives a TA or a TAC. This means that a TAT value shall be preconfigured before the user equipment obtains the TA. Otherwise, the R10 principle may not be observed. In view of the concept of a TA group, the following principles shall be observed as to when to provide or release a TAT value to a TA group including only Scells.

Under a first principle, a value of a TAT shall be configured if a first Scell is assigned for the TA group.

Under a second principle, reconfiguration of a TAT is supported in the R11. A TAT value may not necessarily be configured if a Scell is added into an existing TA group (of course, a change in TAT value can be provided regardless of whether a time alignment timer is currently in operation); and when the user equipment receives a TAT value of a TA group or a TAT value of a Scell belonging to the TA group and a TAT value has been configured for the TA group, the existing TAT value will be replaced with the new TAT value.

Under a third principle, both the user equipment and the base station release a TAT configuration via either explicit or implicit signaling if a last Scell in a group is released, where the explicit signaling means that the base station transmits the signaling and then the user equipment releases the TAT configuration in response to the received signaling from the base station; and the implicit signaling means an automatic release by the user equipment.

There are the following two options for where to transmit a TAT value of a TA group including only Scells:

a) Use of RRC message configuring Scell/TA group i. A TAT value Information Element (IE) is designed in an RRC message for configuring a Scell/TA group.

ii. A TAT value is compulsorily configured for a Scell which is the first to be configured in a TA group.

iii. If a TAT value IE is not used to configure a Scell which is the first to be configured in a TA group, but is used to configure other Scell, then current TAT values of all the Scells in the TA group is replaced with the new TAT value.

iv. A TAT will be started after a TA value corresponding to a TA group is obtained.

b) TAT value being included in PRACH procedure of TA group i. An RAR message or a message 4 is used respectively for a CFRA and a CBRA.

ii. If a TAT value is included in an RAR message or a message of a message 4 for a PRACH procedure over a Scell and the Scell is other than the fist Scell of a TA group, then a previous TAT value of the Scell is replaced with the new TAT value.

c) Use of MAC CE, for example, in MAC activation

With this design, a new MAC CE is designed to allocate a TAT value for a corresponding TA group. Thus a new Logic Channel Identifier (LCID) is required to identify the MAC CE for the purpose of assigning a TAT. The new MAC CE shall clearly identify a TAT value and the corresponding TA group.

d) Process of TAT value received in operation of Time Alignment Timer (TAT)

If a Time Alignment Timer (TAT) of a TA group is in operation and another TAT value related to the TA group is received by the user equipment, then the user equipment restarts the current TAT based upon the new TAT value. Of course, the new TAT value can alternatively be used after the TAT is reset due to another reason, for example, upon reception of a TA Command (TAC).

Figure 2:
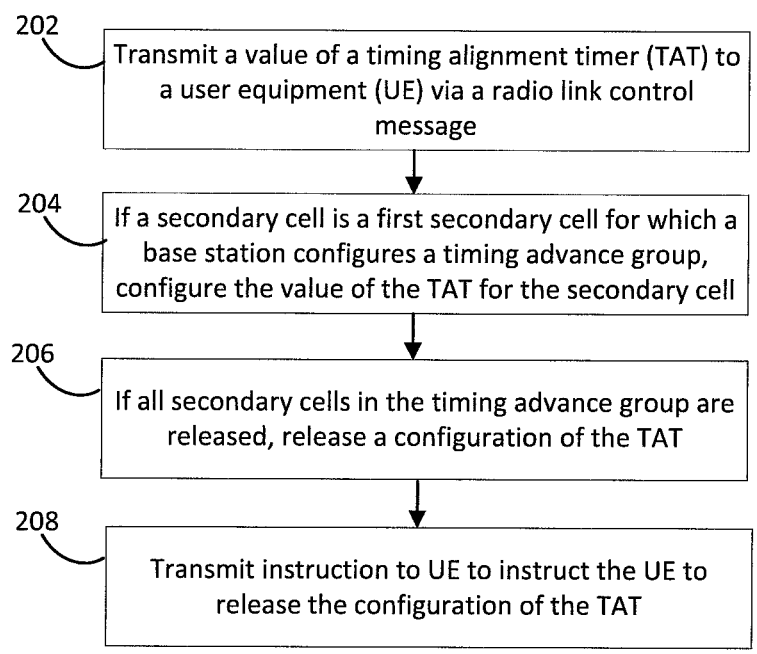
FIG. 2 illustrates an embodiment of a method described herein.

FIG. 2 illustrates an embodiment of a method described herein. In step 202, a value of a TAT is transmitted to a UE via a radio link control message. In step 204, if a secondary cell is a first secondary cell for which a base station configures a TA group, a value of the TAT for is configured for the secondary cell. In step 206, if all secondary cells in the TA group are released, a configuration of the TAT is released. In step 208, an instruction is transmitted to the UE to instruct the UE to release the configuration of the TAT.

The embodiments of the invention have been described above, but the invention will not be limited to a specific system, device and protocol, and those skilled in the art can make various variations or modifications without departing the scope of the invention.

Those ordinarily skilled in the art can appreciate and make other variations to the disclosed embodiments upon review of the description, the disclosure and the drawings as well as the appended claims. In the claims, the term "comprise(s)/comprising" will not preclude another element(s) and step(s), and the term "a" or "an" will not preclude plural. In the invention, the terms "first", "second", etc., denote a name but will not represent any ordinal relationship. In a practical application of the invention, an element may perform functions of a plurality of technical features cited in a claim. Any reference numerals in the claims shall not be construed as limiting the scope of the invention.

The invention claimed is:

1. A base station, comprising:
   at least one processor; and
   at least one memory including computer program code;
   the at least one memory and the computer program code configured to, with the at least one processor, cause the base station at least to perform:
   transmitting the value of the time alignment timer toward a user equipment via a radio resource control message;
   determining whether a secondary cell is a first secondary cell for which the base station configures a timing advance group or the secondary cell is added to an existing timing advance group;
   when the secondary cell is determined to be the first secondary cell for which the base station configures the timing advance group, configuring the value of the time alignment timer for the secondary cell;
   when the secondary cell is determined to be added to an existing timing advance group, reconfiguring an existing time alignment timer value of a secondary cell belonging to the timing advance group with a time alignment timer value already configured for the timing advance group,
   wherein the at least one memory and the computer program code is further configured to, with the at least one processor, cause the base station at least to perform:
   determining that the secondary cell is added to an existing timing advance group; and
   in response to the determination that the secondary cell is added to an existing timing advance group, reconfiguring an existing time alignment timer value of a secondary cell belonging to the timing advance group with a time alignment timer value already configured for the timing advance group.

2. The base station according to claim 1, wherein the at least one memory and the computer program code is further configured to, with the at least one processor, cause the base station at least to perform:
   determining whether all secondary cells in the timing advance group of the secondary cell are released; and
   releasing a configuration of the time alignment timer, if all of the secondary cells are released.

3. The base station according to claim 2, wherein the at least one memory and the computer program code is further configured to, with the at least one processor, cause the base station at least to perform:
   transmitting an instruction to the user equipment to instruct the user equipment to release the configuration of the time alignment timer.

4. A base station, comprising:
   at least one processor; and
   at least one memory including computer program code;
   the at least one memory and the computer program code configured to, with the at least one processor, cause the base station at least to perform:
   transmitting the value of the time alignment timer toward a user equipment in a media access control layer signaling;
   determining whether a secondary cell is a first secondary cell for which the base station configures a timing advance group or the secondary cell is added to an existing timing advance group;
   when the secondary cell is determined to be the first secondary cell for which the base station configures the timing advance group, configuring the value of the time alignment timer for the secondary cell; and
   when the secondary cell is determined to be added to an existing timing advance group, reconfiguring an existing time alignment timer value of a secondary cell belonging to the timing advance group with a time alignment timer value already configured for the timing advance group;
   wherein the at least one memory and the computer program code is further configured to, with the at least one processor, cause the base station at least to perform:

using a logical channel identifier, identifying a media access control layer control element that identifies the value of the time alignment timer and a corresponding timing alignment group.

5. A method of configuring a timing advance group for a secondary cell, in a base station, the method comprising:

transmitting an initial timing advance group identifier to the secondary cell of the user equipment via a radio link control message or a media access control protocol data unit;

determining whether the timing advance group identifier is valid for the secondary cell;

when the timing advance group identifier is invalid for the secondary cell, then triggering a random access procedure of a user equipment over the secondary cell;

obtaining a timing advance value of the user equipment over the secondary cell according to a result of the random access procedure of the user equipment over the secondary cell;

determining a final timing advance group to which the secondary cell belongs according to the timing advance value and comparing obtained timing advance value with timing advance values pre-stored in the base station providing the user equipment with an identifier of the final timing advance group;

taking a timing advance group corresponding to the pre-stored timing advance value as the final timing advance group of the secondary cell, when a difference between the obtained timing advance value and any one of timing advance values pre-stored in the base station is within a predetermined range; or taking a timing advance group corresponding to the obtained timing advance value as the final timing advance group of the secondary cell, when a difference between the obtained timing advance value and any one of the timing advance values pre-stored in the base station exceeds the predetermined range, wherein the base station transmits an identifier of the final timing advance group to the user equipment by any one of the following:

including the identifier of the final timing advance group in a message 2 for transmission to the user equipment, for the user equipment with a contention-free random access; and including the identifier of the final timing advance group in a message 4 for transmission to the user equipment, for the user equipment with a contention-based random access.

* * * * *